(12) United States Patent
Geisler et al.

(10) Patent No.: US 11,920,735 B2
(45) Date of Patent: Mar. 5, 2024

(54) METHOD FOR THERMALLY INSULATING AN EVACUABLE CONTAINER

(71) Applicants: EVONIK OPERATIONS GmbH, Essen (DE); STIEBEL ELTRON Gmbh & Co. KG, Holzminden (DE)

(72) Inventors: Matthias Geisler, Nörten-Hardenberg (DE); Ann-Kathrin Herr, Hanau (DE); Hark-Oluf Asbahr, Gönnheim (DE); Thorsten Schultz, Hassenroth (DE); Dirk Schäffner, Hainburg (DE); Frank Menzel, Hanau (DE); Andreas Meng, Hann. Münden (DE); Dominik Meier, Holzminden (DE)

(73) Assignees: EVONIK OPERATIONS GMBH, Essen (DE); STIEBEL ELTRON GMBH & CO. KG, Holzminden (DE)

( * ) Notice: Subject to any disclaimer, the term of this patent is extended or adjusted under 35 U.S.C. 154(b) by 1121 days.

(21) Appl. No.: 16/620,481

(22) PCT Filed: May 30, 2018

(86) PCT No.: PCT/EP2018/064248
§ 371 (c)(1),
(2) Date: Dec. 6, 2019

(87) PCT Pub. No.: WO2018/224377
PCT Pub. Date: Dec. 13, 2018

(65) Prior Publication Data
US 2020/0124231 A1    Apr. 23, 2020

(30) Foreign Application Priority Data

Jun. 9, 2017  (DE) .................... 10 2017 209 782.5

(51) Int. Cl.
*F17C 3/08*         (2006.01)
*F16L 59/02*        (2006.01)
(Continued)

(52) U.S. Cl.
CPC .............. *F17C 3/08* (2013.01); *F17C 13/001* (2013.01); *F16L 59/028* (2013.01); *F16L 59/065* (2013.01);
(Continued)

(58) Field of Classification Search
CPC ..... F16L 59/028; F16L 59/065; F17C 13/001; F17C 2203/0391; F17C 2209/232; F17C 2209/238
See application file for complete search history.

(56) References Cited

U.S. PATENT DOCUMENTS 2,595,262 A * 5/1952 Hood ........................ B65B 1/22
                                                    141/49
3,532,473 A * 10/1970 Biegler ...................... B01J 2/12
                                                    264/117
(Continued)

FOREIGN PATENT DOCUMENTS

CA         2 201 186       9/1997
CN         106830878       6/2017
(Continued)

OTHER PUBLICATIONS

U.S. Appl. No. 17/792,400, filed Jul. 31, 2022, Lazar.
(Continued)

*Primary Examiner* — Timothy L Maust
(74) *Attorney, Agent, or Firm* — Law Office of Michael A. Sanzo, LLC

(57) ABSTRACT

Method for thermal insulation of an evacuable container comprising an inner container, an outer container and a
(Continued)

Figure 1:
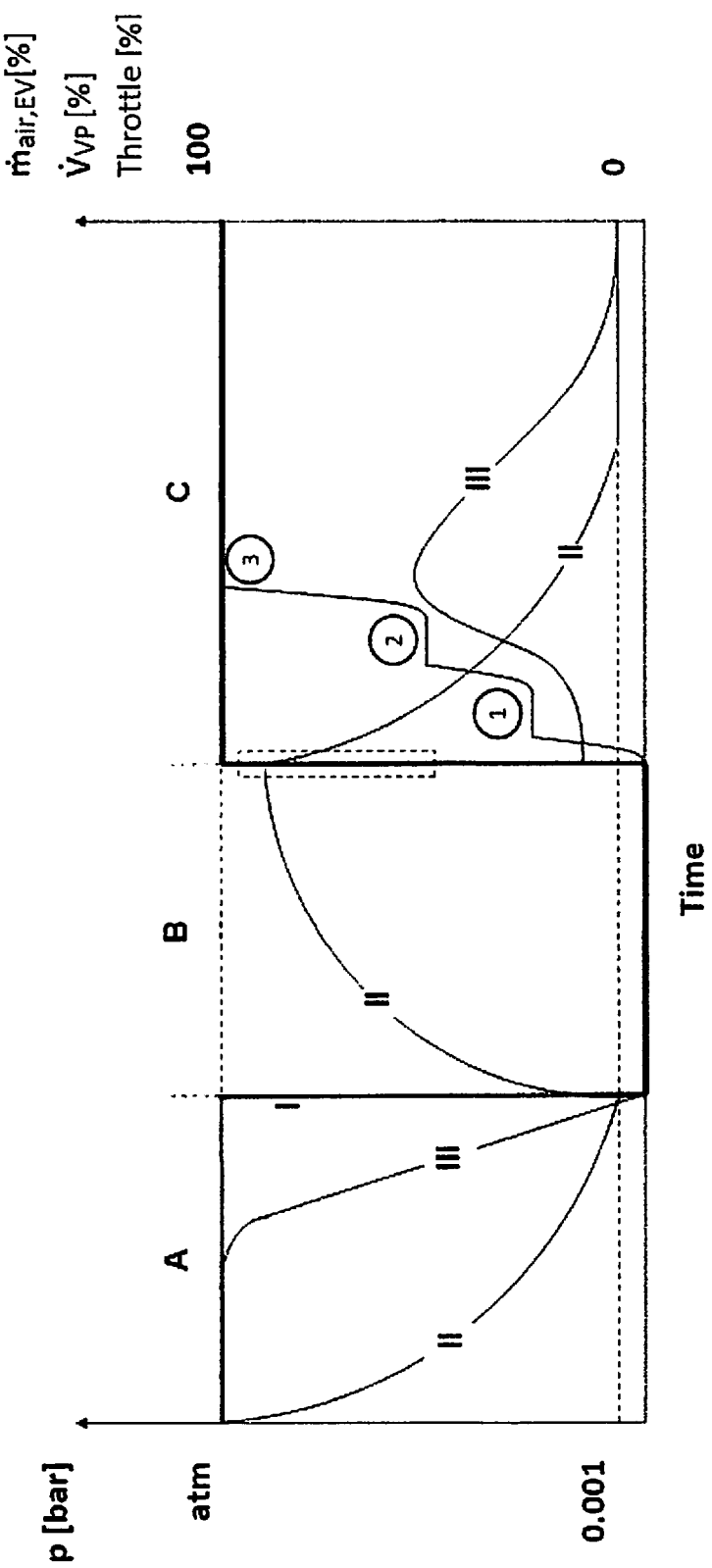

cavity disposed between the inner container and the outer container, wherein said method comprises a) using a vacuum pump to reduce a pressure in the cavity and after achieving a first value of the pressure interrupting the connection to the vacuum pump,
b) subsequently making a connection from a reservoir container of the thermally insulating particulate material to a filling opening provided in the region of the cavity,
c) setting the evacuable container into motion, wherein the thermally insulating particulate material flows into the cavity according to a) and the pressure in the cavity increases due to the air introduced with the thermally insulating particulate material,
d) terminating the filling at a second value of the pressure by interrupting the connection from the cavity to the reservoir container,
e) repeating step a), wherein the output of the vacuum pump with which the cavity is deaerated is controlled such that the profile over time of the mass flow exiting from the cavity of air introduced with the thermally insulating particulate material is at a maximum,
f) subsequently repeating steps b)-e) up to the desired degree of filling and
g) as the final step sealing the evacuated cavity.

19 Claims, 2 Drawing Sheets

(51) Int. Cl.
*F16L 59/065* (2006.01)
*F17C 13/00* (2006.01)

(52) U.S. Cl.
CPC ............... *F17C 2203/0337* (2013.01); *F17C 2203/0391* (2013.01); *F17C 2209/232* (2013.01); *F17C 2209/238* (2013.01); *F24D 2220/08* (2013.01); *F28F 2270/00* (2013.01); *Y10T 29/49776* (2015.01); *Y10T 29/49879* (2015.01)

(56) References Cited

U.S. PATENT DOCUMENTS

| | | | |
|---|---|---|---|
| 3,574,027 A | 4/1971 | Bonnet | |
| 4,048,290 A | 9/1977 | Lee | |
| 4,175,159 A | 11/1979 | Raleigh | |
| 4,212,925 A | 7/1980 | Kratel et al. | |
| 4,247,708 A | 1/1981 | Tsutsumi et al. | |
| 4,276,274 A | 6/1981 | Heckel | |
| 4,286,990 A | 9/1981 | Kleinschmidt et al. | |
| 4,297,143 A | 10/1981 | Kleinschmidt et al. | |
| 5,086,031 A | 2/1992 | Deller et al. | |
| 5,183,710 A | 2/1993 | Gerbino | |
| 5,362,541 A | 11/1994 | Sextl et al. | |
| 5,458,916 A | 10/1995 | Kratel et al. | |
| 5,556,689 A | 9/1996 | Kratel et al. | |
| 5,565,142 A | 10/1996 | Deshpande et al. | |
| 5,589,245 A | 12/1996 | Roell | |
| 5,685,932 A | 11/1997 | Stohr et al. | |
| 5,776,240 A | 7/1998 | Deller et al. | |
| 5,851,715 A | 12/1998 | Barthel et al. | |
| 6,099,749 A | 8/2000 | Boes et al. | |
| 6,174,926 B1 | 1/2001 | Menon et al. | |
| 6,268,423 B1 | 7/2001 | Mayer et al. | |
| 6,303,256 B1 | 10/2001 | Kerner et al. | |
| 6,472,067 B1 | 10/2002 | Hsu et al. | |
| 7,241,336 B2 | 7/2007 | Scharfe et al. | |
| 7,562,534 B2 | 7/2009 | Jibb et al. | |
| 7,674,476 B1 | 3/2010 | Schwertfeger et al. | |
| 7,780,937 B2 | 8/2010 | Meyer et al. | |
| 7,842,269 B2 | 11/2010 | Schachtely et al. | |
| 7,855,248 B2 | 12/2010 | Stenzel et al. | |
| 8,333,946 B2 | 12/2012 | Gottschalk et al. | |
| 8,389,617 B2 | 3/2013 | Meyer et al. | |
| 8,512,595 B2 | 8/2013 | Meyer et al. | |
| 8,603,353 B2 | 12/2013 | Menzel et al. | |
| 8,962,519 B2 | 2/2015 | Heindl et al. | |
| 9,055,748 B2 | 6/2015 | Feucht et al. | |
| 9,233,986 B2 | 1/2016 | Kratel et al. | |
| 9,540,247 B2 | 1/2017 | Stenzel et al. | |
| 9,593,797 B2 | 3/2017 | Kulprathipanja et al. | |
| 9,784,402 B2 | 10/2017 | Menzel | |
| 9,878,911 B2 | 1/2018 | Maisels et al. | |
| 10,179,751 B2 | 1/2019 | Geisler et al. | |
| 10,618,815 B2 | 4/2020 | Hindelang et al. | |
| 10,618,849 B2 | 4/2020 | Albinus et al. | |
| 2003/0095905 A1 | 5/2003 | Scharfe et al. | |
| 2006/0027227 A1 | 2/2006 | Everett et al. | |
| 2007/0220904 A1 | 9/2007 | Jibb et al. | |
| 2008/0277617 A1 | 11/2008 | Abdul-Kader et al. | |
| 2009/0148342 A1* | 6/2009 | Bromberg | C11D 3/48 424/661 |
| 2010/0146992 A1 | 6/2010 | Miller | |
| 2010/0300132 A1 | 12/2010 | Schultz | |
| 2012/0064345 A1 | 3/2012 | Gini | |
| 2012/0286189 A1 | 11/2012 | Barthel et al. | |
| 2013/0071640 A1 | 3/2013 | Szillat | |
| 2014/0150242 A1 | 6/2014 | Kratel et al. | |
| 2014/0230698 A1 | 8/2014 | Stepp et al. | |
| 2015/0000259 A1 | 1/2015 | Dietz | |
| 2015/0183169 A1 | 7/2015 | Ehsani | |
| 2015/0183170 A1 | 7/2015 | Ehsani | |
| 2016/0082415 A1 | 3/2016 | Drexel et al. | |
| 2016/0084140 A1 | 3/2016 | Dietz | |
| 2016/0223124 A1 | 8/2016 | Kulprathipanja et al. | |
| 2016/0258153 A1 | 9/2016 | Koebel et al. | |
| 2016/0326003 A1 | 11/2016 | Ishizuka et al. | |
| 2017/0233297 A1 | 8/2017 | Albinus et al. | |
| 2017/0268221 A1 | 9/2017 | Geisler et al. | |
| 2018/0001576 A1 | 1/2018 | Koebel et al. | |
| 2018/0065892 A1 | 3/2018 | Geisler et al. | |
| 2018/0169931 A1 | 6/2018 | Ehsani | |
| 2019/0002356 A1 | 1/2019 | Hebalkar et al. | |
| 2019/0276358 A1 | 9/2019 | Schultz et al. | |
| 2019/0382952 A1 | 12/2019 | Geisler et al. | |
| 2020/0031720 A1 | 1/2020 | Geisler et al. | |
| 2020/0062661 A1 | 2/2020 | Geisler et al. | |
| 2021/0039954 A1 | 2/2021 | Numrich et al. | |
| 2021/0269359 A1 | 9/2021 | Geisler et al. | |
| 2021/0292233 A1 | 9/2021 | Numrich et al. | |
| 2021/0292238 A1 | 9/2021 | Albinus et al. | |
| 2022/0371261 A1 | 11/2022 | Ehsani | |
| 2023/0002627 A1 | 1/2023 | Lazar et al. | |
| 2023/0062574 A1 | 3/2023 | Menzel et al. | |

FOREIGN PATENT DOCUMENTS

| | | |
|---|---|---|
| CN | 107814552 | 3/2018 |
| DE | 952 891 | 11/1956 |
| DE | 25 33 925 | 2/1977 |
| DE | 30 37 409 | 5/1982 |
| DE | 199 48 394 | 2/2001 |
| DE | 20 2007 013 074 | 3/2008 |
| DE | 10 2007 020 716 | 11/2008 |
| DE | 10 2007 031 635 | 1/2009 |
| DE | 10 2007 042 000 | 3/2009 |
| DE | 10 2007 051 830 | 5/2009 |
| DE | 10 2008 005 548 | 7/2009 |
| DE | 10 2008 036 430 | 2/2010 |
| DE | 10 2010 040 346 | 3/2012 |
| DE | 10 2013 016 705 | 4/2015 |
| DE | 10 2014 203 091 | 8/2015 |
| EP | 0 032 176 | 7/1981 |
| EP | 0 340 707 | 11/1989 |
| EP | 0 645 576 | 3/1995 |
| EP | 0 647 591 | 4/1995 |
| EP | 0 937 755 | 8/1999 |
| EP | 1 700 824 | 9/2006 |

(56) References Cited

FOREIGN PATENT DOCUMENTS

| EP | 1 988 228 | 11/2008 | |
|---|---|---|---|
| EP | 1988228 | 11/2008 | |
| EP | 2 028 329 | 2/2009 | |
| EP | 2 204 513 | 7/2010 | |
| EP | EP 2621873 | 8/2013 | |
| EP | 2 910 724 | 8/2015 | |
| EP | 3 403 818 | 11/2018 | |
| FR | 2873677 | 2/2006 | |
| GB | 919 018 | 2/1963 | |
| KR | 2017/0112396 | 10/2017 | |
| WO | WO 99/05447 | 2/1999 | |
| WO | WO 01/12731 | 2/2001 | |
| WO | WO 03/024705 | 3/2003 | |
| WO | WO 03/064025 | 8/2003 | |
| WO | WO 2005/028195 | 3/2005 | |
| WO | WO 2006/097668 | 9/2006 | |
| WO | WO 2010/126792 | 11/2010 | |
| WO | WO 2011/066209 | 6/2011 | |
| WO | WO 2011/076518 | 6/2011 | |
| WO | WO 2011/083174 | 7/2011 | |
| WO | WO 2012/041823 | 4/2012 | |
| WO | WO 2012/044052 | 4/2012 | |
| WO | WO 2012/049018 | 4/2012 | |
| WO | WO 2013/053951 | 4/2013 | |
| WO | WO 2014/090790 | 6/2014 | |
| WO | WO 2014/095277 | 6/2014 | |
| WO | WO 2015/007450 | 1/2015 | |
| WO | WO2016/031637 | 3/2016 | |
| WO | WO 2016/045777 | 3/2016 | |
| WO | WO-2016045777 A1 * | 3/2016 | ............ F17C 13/001 |
| WO | WO 2016/171558 | 10/2016 | |
| WO | WO 2017/097768 | 6/2017 | |
| WO | WO 2017/102819 | 6/2017 | |
| WO | WO 2018/146137 | 8/2018 | |

OTHER PUBLICATIONS

U.S. Appl. No. 17/792,471, filed Jul. 13, 2022, Menzel.

Mathias, et al., "Basic characteristics and applications of aerosil: 30. The chemistry and physics of the aerosil surface," *Journal of Colloid and Interface Science* 125:61-68 (1988).

Pajonk, et al., "Physical properties of silica gels and aerogels prepared with new polymeric precursors," *J. Non-Cryst. Solids* 186(2):1-8 (Jun. 1995).

Somana, Chotangada Gautham, "Evaluation of Aerogel Composite Insulations by Characterization and Experimental Methods," Thesis; B.Eng., R.V. College of Engineering, Banglore, India, (2012).

U.S. Appl. No. 16/978,164, filed Sep. 3, 2020, US-2021/0039954 A1, Feb. 11, 2021, Numrich.

U.S. Appl. No. 17/260,345, filed Jan. 14, 2021, Numrich.

U.S. Appl. No. 17/260,227, filed Jan. 14, 2021, Geisler.

U.S. Appl. No. 17/260,371, filed Jan. 14, 2021, Albinus.

English language translation of the International Search Report for PCT/EP2018/064248, (international counterpart of U.S. Appl. No. 16/620,481), filed May 30, 2018.

English language translation of the Written Opinion of the International Searching Authority for PCT/EP2018/064248, (international counterpart of U.S. Appl. No. 16/620,481 application), filed May 30, 2018.

English language translation of the International Preliminary Report on Patentability for for PCT/EP2018/064248, (international counterpart of U.S. Appl. No. 16/620,481 application), filed May 30, 2018.

Schreiner, et al., "Intercomparison of thermal conductivity measurements on an expanded glass granulate in a wide temperature range," *International Journal of thermal Sciences* 95:99-105 (2015).

Ulmann's Encyclopedia of Industrial Chemistry, "Silica" chapter, published online on Apr. 15, 2008, DOI: 10.1002/14356007.a23_583.pub3.

U.S. Appl. No. 16/339,081, filed Apr. 3, 2019, US-2019/0276358 A1, Sep. 12, 2019, Schultz.

U.S. Appl. No. 16/484,368, filed Aug. 7, 2019, US-2019/0382952 A1, Dec. 9, 2019, Geisler.

U.S. Appl. No. 16/478,169, filed Jul. 16, 2019, Geisler.

U.S. Appl. No. 16/605,342, filed Oct. 15, 2019, Geisler.

\* cited by examiner ical application PCT/EP2018/064248, which had an international filing date of May 30, 2018, and which was published on Dec. 13, 2018. The application claims priority to German application DE 10 2017 209 782.5, filed on Jun. 9, 2017.

The invention relates to a method for thermal insulation of an evacuable container.

EP-A-645576 discloses a method for filling and compressing insulating powder into hollow walls of a boxlike body with subsequent evacuation of the gaseous medium so that the powder forms a vacuum insulation in the walls. The powder is pumped in at a first pressure and compressed at a second pressure.

DE-A-102010040346 discloses a method for manufacturing a thermally insulating shaped body which comprises the method steps of providing a mold, filling a pourable porous material, for example a granulate of an open-pored rigid plastics foam, an aerogel, a zeolite or a silica, into the mold, consolidating the pourable porous material in the mold and evacuating and sealing the mold.

DE-A-102013016705 discloses a method for insulating a hot water storage means. The hot water storage means comprises an inner container and an outer container, wherein between the inner container and the outer container a cavity for receiving an insulating layer made of an otherwise unspecified pourable fine-grained granulate is provided. The method contains the method steps: Filling the granulate into the cavity, compressing the granulate in the cavity, evacuating and sealing the cavity. The method may be implemented such that initially the granulate is filled into the cavity and compressed and subsequently the cavity is evacuated and sealed or initially the cavity is evacuated, subsequently the granulate is filled and compressed and finally the cavity is sealed.

The prior art also recites methods wherein a thermally insulating material is introduced into a cavity. The material may initially be introduced into the cavity with subsequent evacuation or else the cavity is initially evacuated and the thermally insulating material is introduced into the evacuated cavity. Both methods show disadvantages in execution. Disadvantages are for example in terms of filling duration, settling behaviour or discharging of previously introduced thermally insulating material.

It is accordingly an object of the present invention to provide a method having a short filling duration wherein discharging of thermally insulating material is minimized.

The invention provides a method for thermal insulation of an evacuable container, preferably a hot water container, comprising an inner container, an outer container and a cavity disposed between the inner container and the outer container, wherein the cavity is provided to receive a thermally insulating particulate material and for receiving the thermally insulating particulate material the steps of evacuating the cavity, filling the thermally insulating particulate material into the cavity, compressing the thermally insulating particulate material in the cavity, evacuating the cavity and sealing the cavity are performed, wherein said method comprises a) using a vacuum pump to reduce a pressure in the cavity and after achieving a first value of the pressure interrupting the connection to the vacuum pump, b) subsequently making a connection from a reservoir container of the thermally insulating particulate material to a filling opening provided in the region of the cavity, c) setting the evacuable container into motion, wherein the thermally insulating particulate material flows into the cavity according to a) and the pressure in the cavity increases due to the air introduced with the thermally insulating particulate material, d) terminating the filling at a second value of the pressure by interrupting the connection from the cavity to the reservoir container, e) repeating step a), wherein the output of the vacuum pump with which the cavity is deaerated is controlled such that the profile over time of the mass flow exiting from the cavity of air introduced with the thermally insulating particulate material is at a maximum, f) subsequently repeating steps b)-e) up to the desired degree of filling and g) as the final step sealing the evacuated cavity.

It may be advantageous to likewise set the reservoir container into motion. This motion may be a vibration or rotation both for the evacuable container and for the reservoir container. Stirring, tilting, pressurizing with gas or fluidizing by other means could also be carried out in the reservoir container.

FIG. 1 is a schematic diagram of the method according to the invention when using a throttle valve in the evacuation procedure before sealing the cavity in section C of the figure. In the figure: [atm]=atmospheric pressure; $\dot{V}_{VP}$ [%]=aspirated volume flow; $\dot{m}_{air,\ EV}$ [%]=air mass flow; throttle [%]=throttle valve opening.

Section A shows the pressure (II) in the cavity during evacuation of the cavity not yet filled with the thermally insulating particulate material from atmospheric pressure (atm) to less than 100 mbar, in particular to less than 20 mbar, in particular to less than 5 mbar. A high mass flow of air (III) is initially present and said mass flow falls with falling pressure (II) in each case depending on the volume of the cavity and the aspirated volume flow $\dot{V}_{VP}$ (I) of the vacuum pump.

Section B shows the filling of the cavity with the thermally insulatin. particulate material.

To this end a connection between the reservoir container and the cavity is opened, thus effecting a pressure equalization. A slight negative pressure is generally established in the cavity. The negative pressure depends inter alia on the geometry of the containers, their arrangement with respect to one another and the thermally insulating particulate material. The magnitude of the negative pressure (dashed rectangle) is not determined and is not relevant for performing the method according to the invention.

The mass flow of the outflowing air is zero.

Section C shows the evacuation of the filled annular slot. The evacuation is divided into three sections for example.

Section 1: Evacuation procedure in progress, valve position of throttle increases to 25%. A small mass flow of air is observed.

Section 2: Evacuation procedure in progress, valve position of throttle increases to 50%. A markedly increasing mass flow of air is observed.

Section 3: Evacuation procedure in progress, valve position of throttle increases to 100%. It is observed that the mass flow of air increases further and reaches a maximum.

Evacuation procedure remains in progress until target pressure, for example less than 100 mbar, in particular less than 20 mbar, in particular less than 5 mbar, is achieved. It is observed that the mass flow of air reduces.

Figure 2:
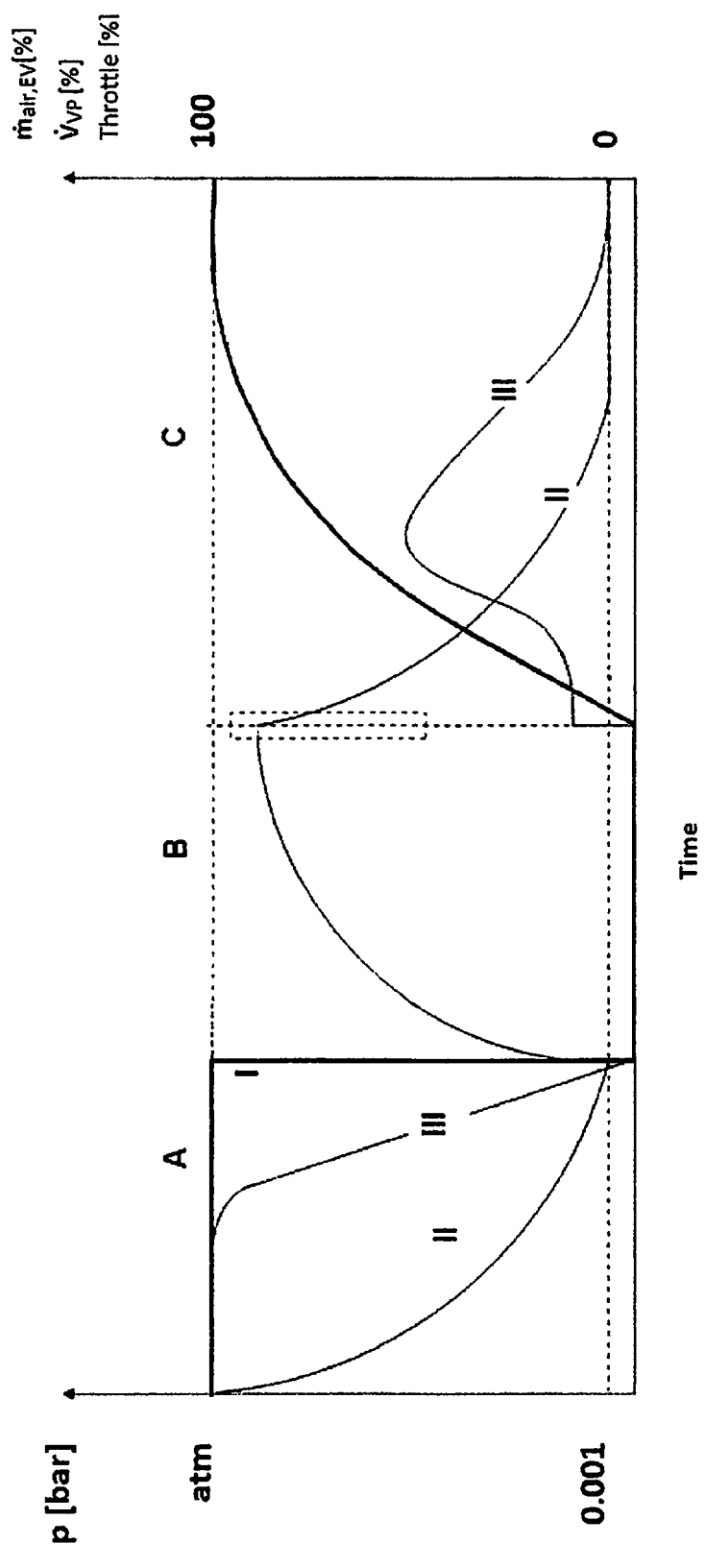

FIG. 2 is a schematic diagram of the method according to the invention when using a controllable vacuum pump in the evacuation procedure before sealing the cavity in section C of the figure.

In the figure: [atm]=atmospheric pressure; $\dot{V}_{VP}$ [%]=aspirated volume flow; $\dot{m}_{air,\,EV}$ [%]=air mass flow.

The comments made in respect of FIG. 1 apply for sections A and B.

Section C shows the evacuation of the filled annular slot. As the pressure stage decreases, the aspirated volume flow $\dot{V}_{VP}$ of the vacuum pump is increased. Mass flow initially increases but then decreases since the proportion of air in the cavity decreases.

A controlled mass flow of air is important for the filling procedure. Said mass flow is thus limited for example to a predetermined low value at commencement of the evacuation, in particular via an output limiting means of the vacuum pump or a throttle valve so that no thermally insulating particulate material is entrained. In a second step when a particular value of the vacuum has already been achieved, the pump output is increased or the throttling is reduced further. This need not necessarily be associated with a mass flow increase of the air since as the vacuum decreases the pump output must increase in order that air may still be aspirated from the cavity against the vacuum.

According to an advantageous concept of the invention, the commencement of the evacuation is commenced with a starting volume flow of air. In the course of the evacuation, the volume flow of air, starting from the starting volume flow, is advantageously further increased, in particular the volume flow of air is increased by approximately 2 to 5 times the starting volume flow or else up to 10 or 20 times the starting volume flow. The mass flow of air advantageously reduces.

The thermally insulating particulate material employed in the method according to the invention is preferably a compressed silica-comprising powder having a tamped density of 50-150 g/l. The tamped density may be determined according to ISO 697/EN ISO 60; DIN 53468.

Such a material has a low thermal conductivity, good flow properties during filling, while discharge during evacuation of the cavity is minimal or entirely negligible. The compressed powder preferably has a thermal conductivity of less than 5 mW/m·K at a pressure of 100 hPa or less than 25 mW/m·K at a pressure of 1000 hPa. The compressed powder is distinct from a granulate in respect of its tamped density and its flow behaviour.

The silica is preferably a pyrogenic silica. Pyrogenically produced silicas are preferably employed. Pyrogenic silicas are generally in aggregated form or at least partly aggregated. "Aggregated" is to be understood as meaning that so-called primary particles formed initially during generation make strong interconnections in the further course of the reaction to form a three-dimensional network. The description "at least partly aggregated" is intended to elucidate that in addition to aggregates isolated individual particles may also be present, wherein at least 80% of the hydrophobized silicon dioxide particles should be present in the form of aggregates. Such a silica shows good values in respect of both thermal insulation and mechanical stability of the three-dimensional network. The ratio of aggregate to isolated individual particles may be determined for example by quantitative evaluation of TEM micrographs (TEM=transmission electron microscopy). The silicon dioxide particles are amorphous.

The term "pyrogenically" encompasses production of silica by means of flame hydrolysis and flame oxidation. Here, oxidizable and/or hydrolysable starting materials are oxidized or hydrolysed generally in a hydrogen/oxygen flame. Starting materials that may be used for pyrogenic methods include organic and inorganic substances. Silicon tetrachloride is particularly suitable. The thus obtained hydrophilic silica is very largely pore-free and has free hydroxyl groups on its surface. The BET surface area of pyrogenic silica is generally 30 to 500 m$^2$/g. For the method according to the invention, in particular a BET surface area of at least 150 m$^2$/g is preferred.

The silica used in the method according to the invention may comprise a hydrophilic silica, a hydrophobized silica or at least one hydrophilic and at least one hydrophobic silica.

It has proven particularly useful to employ a hydrophobized silica. These are obtained from the reaction of hydrophilic silicas with a hydrophobizing agent. The hydroxyl groups present at the surface of the hydrophilic silica are partly or completely converted. The degree of hydrophobization may be determined by the methanol wettability.

Thus, the silica should have a methanol wettability of at least 20 vol % of methanol, preferably 20-80 vol % of methanol. Hydrophobic silicas may be rendered water-wettable by addition of methanol. This is effected by methanol/water mixtures of different concentrations. This makes it possible to reveal the degree of hydrophobization of the silicas.

The hydrophobized silica may preferably be obtained by reaction of a hydrophilic silica with an organosilane from the group consisting of $R_n$—Si—$X_{4-n}$, $R_3$Si—Y—Si$R_3$, $R_n$Si$_n$O$_n$, $(CH_3)_3$—Si—(O—Si$(CH_3)_2)_n$—OH, HO—Si$(CH_3)_2$—(O—Si$(CH_3)_2)_n$—OH, where n=1-8; R=—H, —CH$_3$, —C$_2$H$_5$; X=—Cl, —Br; —OCH$_3$, —OC$_2$H$_5$, —OC$_3$H$_8$, Y=NH, O.

The hydrophobic properties thereof ensure that only very small amounts, if any, of adhering water are introduced into the cavity to be filled. Adhering water can result in an undesired reduction of the vacuum and thus in an increased thermal conductivity. It may therefore be advantageous to introduce the thermally insulating particulate material in a very largely water-free state. While this may be achieved by drying methods or a subsequent reduction in pressure, this can slow the filling procedure.

The compressed powder is preferably employed as a mixture of a silica and an IR opacifier. A proportion of 60-90% by weight of a silica and 10-40% by weight of an IR opacifier is particularly preferred. Suitable IR opacifiers are titanium oxides, zirconium oxides, ilmenites, iron titanates, iron oxides, zirconium silicates, silicon carbide, manganese oxides, graphites and/or carbon blacks. The particle size of the opacifiers is generally between 0.1 and 25 µm. In the case of silicon carbide and titanium oxides, the average particle diameter d50 is preferably 1 to 10 µm, particularly preferably 2 to 8 µm.

The invention claimed is:

1. A method for thermally insulating an evacuable container comprising an inner container, an outer container and a cavity disposed between the inner container and the outer container, wherein the cavity is provided to receive a thermally insulating particulate material; and wherein the method for providing the cavity with the thermally insulating particulate material comprises the steps of: evacuating the cavity; filling the cavity with the thermally insulating particulate material; compressing the thermally insulating particulate material in the cavity; evacuating the cavity; and sealing the cavity; wherein:

a) a vacuum pump is used to reduce pressure in the cavity and after achieving a first value of the pressure, connection between the cavity and the vacuum pump is interrupted;

b) subsequently making a connection from a reservoir container of the thermally insulating particulate material to a filling opening provided in the region of the cavity;

c) setting the evacuable container into motion, wherein the thermally insulating particulate material flows into the cavity according to a) and the pressure in the cavity increases due to air introduced with the thermally insulating particulate material;

d) terminating the filling at a second value of the pressure by interrupting the connection from the cavity to the reservoir container;

e) repeating step a), wherein the output of the vacuum pump with which the cavity is deaerated is controlled such that the profile over time of the mass flow exiting from the cavity of air introduced with the thermally insulating particulate material is at a maximum;

f) subsequently repeating steps b)-e) until desired degree of filling is reached; and g) as the final step sealing the evacuated cavity.

2. The method of claim 1 wherein the reservoir container is set into motion.

3. The method of claim 1, wherein the motion is a vibration or rotation.

4. The method of claim 1, wherein the thermally insulating particulate material is a compressed silica-comprising powder having a tamped density of 50-150 g/l.

5. The method of claim 4, wherein the silica is a hydrophobized silica.

6. The method of claim 4, wherein the silica is a hydrophilic silica.

7. The method of claim 4, wherein the silica comprises at least one hydrophilic and at least one hydrophobic silica.

8. The method of claim 4, wherein the compressed powder is a mixture of a silica and an IR opacifier.

9. The method of claim 8, wherein the proportion of the silica is 60-90% by weight and the proportion of the IR opacifier is 10-40% by weight.

10. The method of claim 3, wherein the thermally insulating particulate material is a compressed silica-comprising powder having a tamped density of 50-150 g/l.

11. The method of claim 10, wherein the silica is a hydrophobized silica.

12. The method of claim 10, wherein the silica is a hydrophilic silica.

13. The method of claim 10, wherein the silica comprises at least one hydrophilic and at least one hydrophobic silica.

14. The method of claim 10, wherein the compressed powder is a mixture of a silic and an IR opacifier.

15. The method of claim 14, wherein the proportion of the silica is 60-90% by weight and the proportion of the IR opacifier is 10-40% by weight.

16. The method of claim 14, wherein the silica is a hydrophobized silica.

17. The method of claim 14, wherein the silica is a hydrophilic silica.

18. The method of claim 17, wherein the silica comprises at least one hydrophilic and at least one hydrophobic silica.

19. The method of claim 18, wherein the proportion of the silica is 60-90% by weight and the proportion of the IR opacifier is 10-40% by weight.

* * * * *